United States Patent Office 2,961,421
Patented Nov. 22, 1960

2,961,421

INTERPOLYMER LATICES COMPRISING ACRYLATES AND MONOVINYLIDENE AROMATIC HYDROCARBONS, PROCESS OF PREPARING SAME AND CELLULOSE COATED THEREWITH

Oscar P. Cohen, Longmeadow, and Mary D. Lindstrom, Springfield, Mass., assignors to Monsanto Chemical Company, St. Louis, Mo., a corporation of Delaware No Drawing. Filed Feb. 17, 1958, Ser. No. 715,510

14 Claims. (Cl. 260—29.6)

The present invention is directed to vinylidene interpolymer latices and more particularly to latices of this type adapted for use as coatings on cellulosic substrates utilized in dispensing food.

A large volume of business has evolved from the sale of foods in disposable containers formed of paper or other cellulosic materials. Generally, the materials need only meet the standards for strength and health in order to be acceptable. However, when the containers are to be used directly, as is true in the case of beverages, the requirements become more stringent. This is particularly true when the contents are hot as in the case of soups, coffee, cocoa, etc., and the container is likely to be contacted by the consumer's mouth.

The use of uncoated paper containers has met with considerable opposition. Initially, the paper contributes an unpleasant sensation on contact. In addition the contents solvate certain of the residual treating agents left in the paper, lending unpalatability to the contents. Also, the contents become absorbed by the paper resulting in deterioration of the shape and integrity of the container. In attempting to overcome the latter shortcoming, many coatings have been used, among them various waxes, synthetic rubber and other polymeric latices, having melting points above the anticipated temperatures of the contents. While these expedients have been successful in remedying certain aspects of the difficulty, none to date have done so in a fully acceptable manner for the reason that they contribute further to unpalatability, the result of foreign and unpleasant taste emanated by the coatings themselves. Additionally, the coatings used to date evidence blocking, which results in the containers sticking together and interrupting operation of dispensing machines which depend upon gravitational type displacement of the containers prior to their being filled with the contents.

Accordingly, it is a principal object of the present invention to provide vinylidene interpolymer latices which can be coated on substrates used in food dispensing.

Another object is to provide such coated products which can be used as containers for dispensing hot liquids.

Other objects of the invention will in part be obvious and will in part appear hereinafter.

These and other objects of the present invention are obtained by providing interpolymer latices comprising (a) an ester of acrylic acid the alcohol moiety of which contains 2–8 carbon atoms and (b) a hardening comonomer which is a polymerizable monovinylidene aromatic hydrocarbon. The interpolymer is the type produced by emulsion polymerization in which a first monomer charge comprising the ester and a portion of the hardening comonomer equal to 5–30% of the total monomers and a second monomer charge comprising the remainder of the monomers are charged in sequence and at substantially constant rate into an aqueous medium containing a polymerization emulsifier maintained at polymerization temperature. Addition of the monomer charges is carried out together with the charging at constant rate of a polymerization catalyst contained in an aqueous composition to the medium. Polymerization conditions are then maintained until the monomers are essentially all polymerized.

The following examples are given in illustration of the present invention. Where parts are mentioned, parts by weight are intended unless otherwise prescribed.

*Example 1*

The following charges are premixed:

Kettle Charge:
   Water _____ 39.6
   Tetrasodium pyrophosphate_____ .0202
   Aralkyl polyether alcohol_____ .166
   Sodium salt of an aralkyl polyether sulfate___ .0740
   Ethylene-maleic anhydride (sp. visc. 0.1 determined as a 1.0% solution in dimethylformamide at 25° C.)_____ .0987
   Ammonium hydroxide (29%)_____ .196
Catalyst Charge:
   Water _____ 13.0
   Potassium persulfate_____ .259
   Sodium salt of an aralkyl polyether sulfate___ 1.05
Monomer Charge I:
   Styrene _____ 4.9
   Ethyl acrylate_____ 16.2
Monomer Charge II:
   Styrene _____ 17.7
Neutralization:
   Ammonium hydroxide (29%)_____ .787
Soap Addition:
   33% aqueous solution of an aralkyl polyether alcohol _____ 5.89

The kettle charge is added to a 2-liter, round bottomed, four necked flask fitted with a pair of funnels, an agitator and a condenser and heated to reflux temperature accompanied with agitation. Monomer I charge is then added slowly and continuously over a period of 60–65 minutes. After the first monomer mixture has been completely added, the second monomer charge is added to the kettle charge over a period of 50–60 minutes. Simultaneously, with the addition of the monomeric charges the catalyst charge is added to add about 83% of the total over a period of 120 minutes.

The batch is allowed to reflux for 20–30 minutes after all the monomers are charged at which time the remaining 17% of the catalyst mixture is added and refluxing continued with agitation for an additional hour. At this point the batch is stripped of water and residual monomer by steam distillation in order to concentrate the same to 45% solids, then is cooled and strained through cheesecloth. The pH is then adjusted to 9–10 by addition of the neutralization charge (aqueous ammonia). To further stabilize the product, the soap addition charge is added to the neutralized latex.

The resultant latex is flush coated or spray coated on the interior of paper containers, (cups) dried and fused at about 300° F. The coating so obtained is glossy, and resistant to grease and food or beverage stains. To test for odor, the coated container is filled with boiling water and covered for 5 minutes. When the cover is removed, there is no objectionable odor detected in the evolved steam.

To test for tackiness a circular disc 1 inch in diameter is cut from the bottom of one of the coated containers. The coated side of the disc is covered with another disc of the uncoated paper board. The two discs are placed in a 50° C. circulating air oven at 75% relative humidity. A weight sufficient to create a pressure of 1 lb./sq. inch is placed on the discs and allowed to remain in place for 8 hours. After 8 hours the discs are removed from the oven. They drop apart with no sign of adhesion between the two.

Example II

Substantially the same procedure as set forth in Example I is again followed. The constituents are also the same with the exception of the amounts of the monomeric charges which are:

| Monomer Charge I | Amounts (grams) |
| --- | --- |
| Ethyl acrylate | 15.7 |
| Styrene | 9.9 |
| Monomer Charge II | |
| Styrene | 13.2 |

The latex which results when flush or spray coated on paper stock or containers, and dried and fused at 300° F. yields a food-resistant glossy coating on the board. Substantially the same high standards as to minimum odor and blocking are exhibited as evidenced by the latex of Example I.

Example III

The constituents of Example I are again used; however, the procedure is varied to the extent that the addition of the monomer charge is reversed, i.e., the first monomer charge added has 17.7 grams of styrene and the second monomer charge has 16.2 grams of ethylacrylate and 4.9 grams of styrene. The latex which results when coated on paper containers gives a film which passes the blocking test but which fails the odor test set forth in Example I.

Example IV

The constituents substantially in the amounts set forth in Example I are again used. The procedure is varied to the extent that a single premix or charge including all of the monomeric constituents is prepared. This charge is added simultaneously with the catalyst charge over a period of about 120 minutes. The resultant latex exhibits blocking when applied as described and an odor is detected when tested with boiling water.

Example V

Substantially the same procedure as set forth in Example I is again followed. The constituents are the same with the exception of the monomeric charges, which are:

| Monomer Charge I | Amounts (grams) |
| --- | --- |
| Styrene | 5.4 |
| Butyl acrylate | 15.7 |
| Monomer Charge II | |
| Styrene | 17.7 |

The latex which results exhibits substantially the same standards of performance as that of Example I when subjected to the tests set forth.

Example VI

Substantially the same procedure as set forth in Example I is again followed. The constituents used are the same with the exception of the monomeric charges, which are:

| Monomer Charge I | Amounts (grams) |
| --- | --- |
| Styrene | 5.9 |
| Hexyl acrylate | 15.2 |
| Monomer Charge II | |
| Styrene | 17.2 |

The resulting latex exhibits substantially the same standards of performance as that of Example I when subjected to the tests outlined there.

The present invention is directed to the provision of vinylidene interpolymer latices which are adapted for use as coatings on cellulosic substrates, the product in turn exhibiting a minimum of tackiness and odor emission when exposed to heated food products and the like. Realization of this can be had by providing interpolymer latices comprising (a) an ester of acrylic acid the alcohol moiety of which contains 2–8 carbon atoms and (b) a hardening comonomer which is a polymerizable monovinylidene aromatic hydrocarbon. The interpolymer is the type produced by emulsion polymerizing a first monomer charge comprising the ester and a portion of the hardening comonomer equal to 5–30% and more particularly 5–10% of the total monomers prior to charging of the remainder of the monomers and polymerization of the same. Charging of the monomer charges is carried out continuously and simultaneously at substantially constant rate with charging of a polymerization catalyst, the latter contained in an aqueous composition, into an aqueous medium containing polymerization emulsifiers and maintained under agitation and at reflux temperature.

The hardening comonomers which can be included are monovinylidene aromatic hydrocarbons, substituted monovinylidene hydrocarbons and mixtures thereof. More particularly these will include o-methyl styrene, m-methyl styrene, p-methyl styrene, 2,4-dimethyl styrene, 2,5-dimethyl styrene, 3,4-dimethyl styrene, 3,5-dimethyl styrene, 2,4,5-trimethyl styrene, 2,4,6-trimethyl styrene, 2,4,5-triethyl styrene, alpha-ethyl styrene, o-ethyl styrene, m-ethyl styrene, p-ethyl styrene, 3,5-diethyl styrene, p-n-butyl styrene, m-sec.-butyl styrene, m-tert.-butyl styrene, p-hexyl styrene, p-n-heptyl styrene, p-2-ethyl hexyl styrene, vinyl naphthalene, vinyl toluene, o-vinyl toluene, m-vinyl toluene, p-vinyl toluene, etc. and mixtures thereof. The amounts of hardening comonomer which are particularly attractive are 40–65% on the weight of the interpolymer with a further preference limited to about 52–56%. As to the acrylates, those having 2–8 carbon atoms in the alcoholic moiety are preferred. The greater number of carbons in the alcoholic moiety will contribute to odor emission, consequently, the lower are the more preferred. The acrylates, which can be considered as a softening comonomer, include ethyl, propyl, butyl, hexyl, octyl, 2-ethylhexyl, etc., and mixtures thereof, with preference directed to the ethyl acrylate. The amounts to be used are preferably 60–35% with the further preference of 48–44% on the weight of the interpolymer.

The latices which result can be visualized as constituted of a center core and an outer shell. The core consists of a relatively soft composition constituting the acrylate and 5–30% preferably 5–10%, of hardening comonomer, the initial 5% of the hardening comonomer, in the core, and correspondingly entered in the first monomer charge, is designed to facilitate polymerization of the acrylate. The remainder up to 30% and preferably to 10% serves to complete this charge. The shell constitutes substantially 100% by weight of hardening comonomer. In the interrelationship between core and shell, the core represents 40–65% and the shell represents 60–35% by weight of the total. The result is a latex which has good flow characteristics and minimum odor emission.

In accordance with the preceding, the process to which the present invention is directed involves the selective addition and emulsion polymerization of monomeric constituents. In this respect, a kettle or reaction vessel charge, aqueous in nature, is provided which includes the emulsifier or emulsifiers which can include the usual nonionic and anionic emulsifying agents. The nonionic emulsifiers are preferably aralkyl polyether alcohols, the preferred concentration of which varies from 0.1 to 1.0% by weight of the total latex. If an anionic type is used, it should be of the sulfonated type, the concentration of which varies from 0.25 to 1.0% by weight of the interpolymer latex. Anionic emulsifiers can also be added with the aqueous catalyst solution and with the monomers. Preferably, the kettle charge, or reaction medium as it can be so considered, is maintained at a temperature of 50 to 150° C., and usually at 80–100° C. with reflux and agitation. While so maintained the catalyst charge which is provided in the presence of water is added continuously and slowly or at a constant rate for a period of 100–140 minutes. Catalysts which perform desirably include potassium and ammonium persulfate, hydrogen peroxide, cumene hydroperoxide, etc.

The additions of the monomeric charges are carried out at a constant rate and are coordinated in time with the addition of the catalyst composition. The first monomeric charge (monomer charge I) is preferably added at a constant rate, over a period ranging between 60–65 minutes or about the initial or first half of the catalyst addition period. As previously described, this charge will include essentially all of the softening comonomer, acrylate, and a portion of the styrene equal to 5–30% of the amount of the total monomers. This period is designed to provide substantially complete polymerization of the monomeric components, particularly the softening comonomer. Accordingly, some variation below 60 and above 65 minutes may be experienced. The amount of styrene added is primarily intended to facilitate the polymerization of the acrylate, thus it should be kept at a minimum.

The addition of the second monomer charge (monomer charge II) is instituted upon the completion of the first monomer charge. The second monomer charge is essentially hardening comonomer. The period for addition is preferably 50–60 minutes and constant rate. Ideally, the termination of this addition should coincide with the termination of the addition of the catalyst charge.

The monovinylidene aromatic latices which result from the present invention are peculiarly adapted for use as coating applications in cellulosic materials, paper board, webs, matrixes, and like substrates from which to fabricate containers for foods, beverages and the like. They can also be coated onto the containers which have already been fabricated into the desired form. They transcend for utility, particularly in the containment of hot liquids and solids of consumable nature, the prior art expedients. In addition to this, the latices exhibit high vapor impermeability which is conducive to low moisture-vapor transmission thus keeping foods moist or dry as the occasion requires during storage periods. Illustrative uses for the coated products are dispenser cups and the like for soups, cocoa, coffee, etc., also straws used in the consumption of liquids, cigarette tips, acoustic tiles and panels, etc.

It will thus be seen that the objects set forth above, among those made apparent from the preceding description, are efficiently attained and, since certain changes may be made in carrying out the above process and in the composition set forth without departing from the scope of the invention, it is intended that all matter contained in the above description shall be interpreted as illustrative and not in a limiting sense.

We claim:

1. Monovinylidene interpolymer latices adapted for coating cellulosic substrates comprising an interpolymer of (a) 60–35% by weight of an acrylate selected from the class consisting of alkyl esters of acrylic acid, the alkyl radicals of which contain 2–8 carbon atoms and (b) 40–65% by weight of a hardening comonomer selected from the class consisting of unsubstituted monovinylidene aromatic hydrocarbons, alkyl substituted monovinylidene aromatic hydrocarbons and mixtures thereof; said interpolymer being provided by an emulsion polymerization process in which an aqueous composition containing a polymerization catalyst is charged at essentially constant rate during an addition period of 100–140 minutes to an aqueous medium containing an emulsifying agent selected from the class consisting of anionic emulsifying agents, nonionic emulsifying agents and mixtures of the same, and maintained at a temperature of 50–150° C. adding at essentially constant rate a first monomer charge comprising essentially all of said ester and a portion of the hardening comonomer equal to 5–30% by weight of the total monomers used in said process during about the first half of said addition period, then adding the remainder of said hardening comonomer over the remainder of said addition period and continuing the polymerization substantially to completion.

2. The latices according to claim 1 wherein the acrylate comprises ethyl acrylate.

3. The latices according to claim 1 wherein the acrylate comprises butyl acrylate.

4. The latices according to claim 1 wherein the acrylate comprises hexyl acrylate.

5. The latices according to claim 1 wherein the hardening comonomer comprises styrene.

6. The latices according to claim 1 wherein the acrylate comprises 48–44% and the hardening comonomer 52–56% by weight of the interpolymer.

7. A process for producing monovinylidene interpolymer latices adapted for coating cellulosic substrates comprising an interpolymer of (a) 60–35% by weight of an acrylate selected from the class consisting of alkyl esters of acrylic acid, the alkyl radicals of which contain 2–8 carbon atoms and (b) 40–65% by weight of a hardening comonomer selected from the class consisting of unsubstituted monovinylidene aromatic hydrocarbons, alkyl substituted monovinylidene hydrocarbons and mixtures thereof, said process comprising as emulsion polymerization process in which an aqueous composition containing a polymerization catalyst is charged at essentially constant rate during an addition period of 100–140 minutes to an aqueous medium containing an emulsifying agent selected from the class consisting of anionic emulsifying agents, nonionic emulsifying agents and mixtures of the same and maintained at a temperature of 50–150° C., adding at essentially constant rate a first monomer charge comprising essentially all of said ester and a portion of the hardening comonomer equal to 5 to 30% by weight of the total monomers used in said process during about the first half of said addition period, then adding the remainder of said hardening comonomer over the remainder of said addition period and continuing the polymerization substantially to completion.

8. The process according to claim 7 wherein the acrylate comprises ethyl acrylate.

9. The process according to claim 7 wherein the hardening comonomer comprises styrene.

10. The process according to claim 7 wherein the acrylate comprises 48–44% and the hardening comonomer comprises 52–56% by weight of the interpolymer.

11. A food container evidencing low-odor evolution when contacted with hot contents comprising a cellulosic substrate coated with monovinylidene interpolymer latices comprising an interpolymer of (a) 60–35% by weight of acrylate selected from the class consisting of alkyl esters of acrylic acid, the alkyl radicals of which contain 2–8 carbon atoms and (b) 40–65% by weight of a hardening comonomer selected from the class consisting of unsubstituted monovinylidene aromatic hydrocarbons, alkyl substituted monovinylidene aromatic hydrocarbons, and mixtures thereof, said interpolymer being provided by an emulsion polymerization process in which an aqueous composition containing a polymerization catalyst is charged at essentially constant rate during an addition period of 100–140 minutes to an aqueous medium containing an emulsifying agent, adding at substantially constant rate a first monomer charge comprising essentially all of said ester and a portion of the hardening comonomer equal to 5–30% by weight of the total monomers used in said process during about the first half of said addition period, then adding the remainder of said hardening comonomer over the remainder of said addition period and continuing the polymerization substantially to completion.

12. The food container according to claim 11 wherein the acrylate in said latices comprises ethyl acrylate.

13. The food container according to claim 11 wherein the hardening comonomer in said latices comprises styrene.

14. The food container according to claim 11 wherein the acrylate comprises 48–44% by weight and the hardening comonomer comprises 52–56% by weight.

References Cited in the file of this patent

UNITED STATES PATENTS 2,583,274    Niles _____ Jan. 22, 1952

FOREIGN PATENTS 679,562    Great Britain _____ Sept. 17, 1952